E. SCHNEIDER.
MOTOR VEHICLE FOR THE TRANSPORT AND OPERATION OF SMALL CALIBER GUNS.
APPLICATION FILED MAR. 31, 1919
1,377,603.
Patented May 10, 1921.
6 SHEETS—SHEET 3.
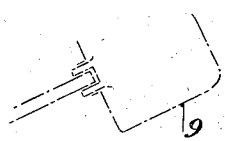
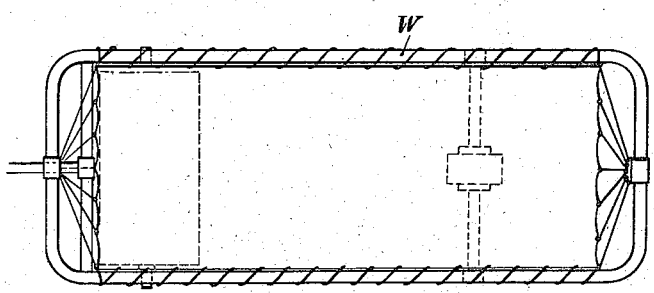
Fig. 2.ᵃ
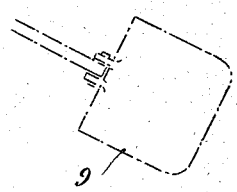
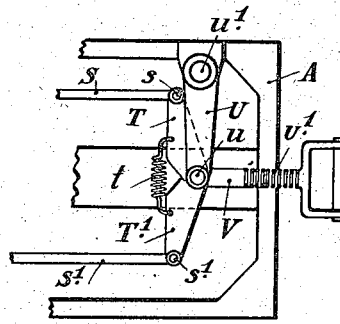
Fig. 7.

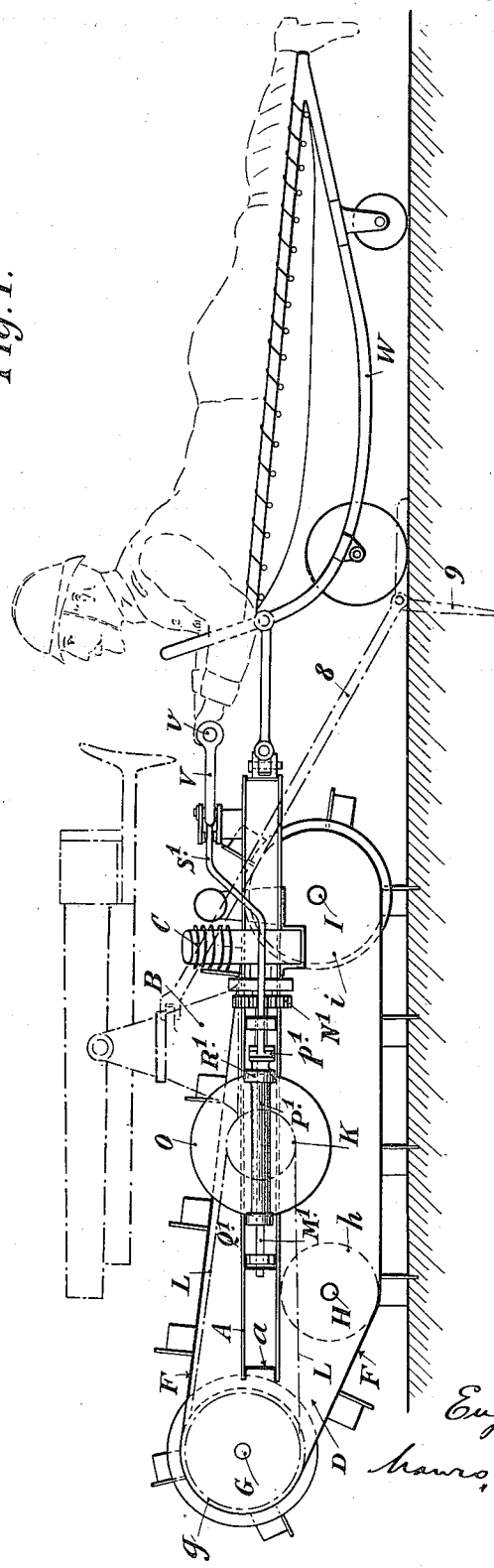

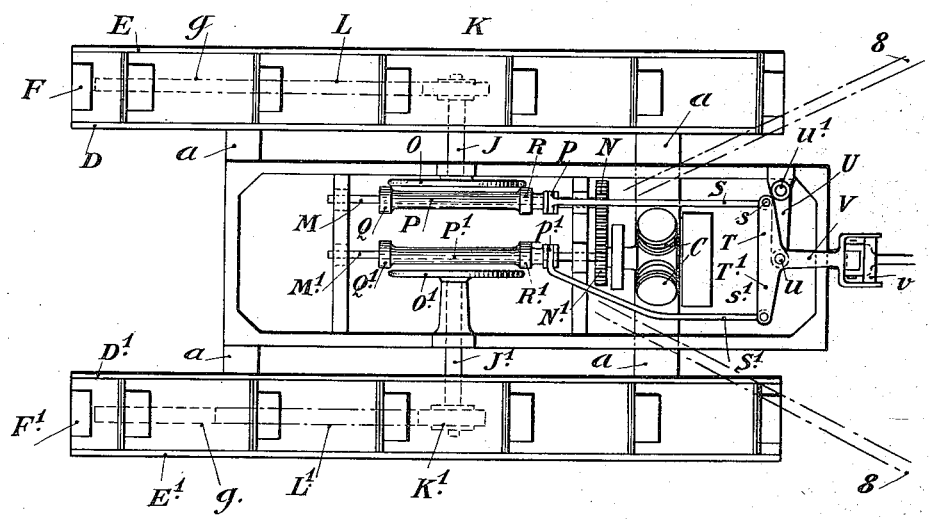

E. SCHNEIDER.
MOTOR VEHICLE FOR THE TRANSPORT AND OPERATION OF SMALL CALIBER GUNS.
APPLICATION FILED MAR. 31, 1919

1,377,603.

Patented May 10, 1921.
6 SHEETS—SHEET 4.

E. SCHNEIDER.
MOTOR VEHICLE FOR THE TRANSPORT AND OPERATION OF SMALL CALIBER GUNS.
APPLICATION FILED MAR. 31, 1919

1,377,603.

Patented May 10, 1921.

E. SCHNEIDER.
MOTOR VEHICLE FOR THE TRANSPORT AND OPERATION OF SMALL CALIBER GUNS.
APPLICATION FILED MAR. 31, 1919

1,377,603.

Patented May 10, 1921.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

MOTOR-VEHICLE FOR THE TRANSPORT AND OPERATION OF SMALL-CALIBER GUNS.

1,377,603.　　　　　Specification of Letters Patent.　　Patented May 10, 1921.

Application filed March 31, 1919. Serial No. 286,484.

*To all whom it may concern:*

Be it known that I, EUGÈNE SCHNEIDER, a citizen of the French Republic, and a resident of 42 Rue d'Anjou, Paris, France, have invented a new and useful Improved Motor-Vehicle for the Transport and Operation of Small-Caliber Guns, which invention is fully set forth in the following specification.

This invention has for its object to provide an improved motor vehicle for the transport and operation of small caliber guns. This improved vehicle is characterized first by the feature that it is composed of two elements, namely, of a transport vehicle whereof the carriage framing is adapted to carry a gun carriage or pedestal or munitions as well as a motor, and of a trailer. The essential characteristic feature of the transport vehicle resides in the apparatus by which the control of the speed-changing and driving mechanism of the motor and the steering of the vehicle is effected by means of a single control member situated at the rear of the framing within reach of the operator who himself can be carried by the trailer that is drawn by the transport vehicle.

In a practical constructional form of the invention the framing of the transport vehicle is carried either by endless track-trucks or by pairs of side plates between which the endless chains are guided. These chains or endless tracks are actuated by two cross shafts mounted in the framing of the vehicle and in the trucks or guide plates of the chains, and arranged in line with each other. These shafts receive their motion from two parallel longitudinal shafts connected together by gearing, and one of these shafts is driven directly by the motor. The speed-changing or the steering of the transverse shafts is effected by the displacement over friction disks fixed on the said shafts, of rollers carried by sleeves sliding along the longitudinal shafts. Connecting rods which are connected at one end to the said longitudinal shafts, are connected at their other ends to a rocking beam which is in its turn connected to the end of a lever fulcrumed on the framing of the vehicle. By the mere displacement of this rocking beam by means of a control rod, the two cross shafts are caused to run at the same speed or at different speeds, according as the rocking beam and the lever fulcrumed to the framing are moved together, or the rocking beam is moved angularly around its pivot on the said lever.

The invention comprises further, an apparatus for limiting the displacements of the friction rollers according to determined limits between which the speed of the motor can be varied, and also an elastic shock-absorbing apparatus interposed between the rod and the handle of the control of the rocking beam actuating the connecting rods that serve to shift the roller-bearing sleeves. The invention also comprises various practical constructions of the transport vehicle and of the trailer for carrying the steerer and operator.

In the accompanying drawings:

Figure 1 is a side elevation of one constructional form of the improved vehicle shown in the traveling position.

Figs. 2 and 2$^a$, which are complements of each other, show a plan thereof.

Fig. 3 is a horizontal section along the axis of the roller-bearing sleeve.

Fig. 4 is a section on the line IV—IV of Fig. 3.

Figs. 5 and 6 are part horizontal sections drawn to a larger scale, illustrating the operation of the speed-limiting apparatus.

Fig. 7 is a partial plan drawn to a larger scale, of the modified construction of the parts for controlling the roller-bearing sleeves.

Figure 3:
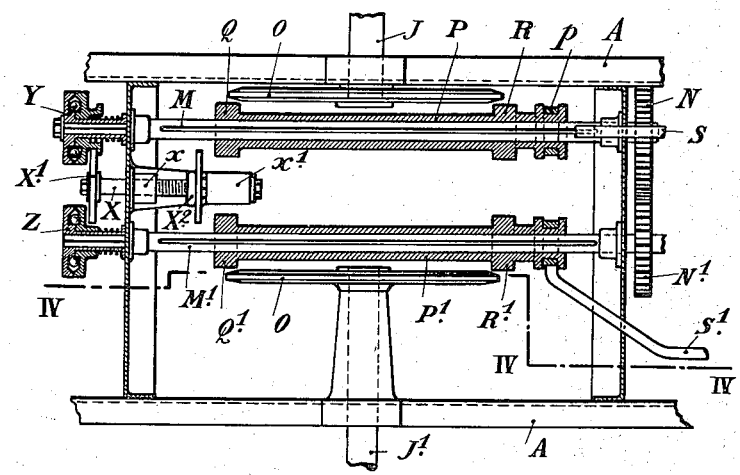
Figs. 3 to 6 illustrate the application of a speed-limiting apparatus to the driving mechanism of the endless chains.
Figure 4:
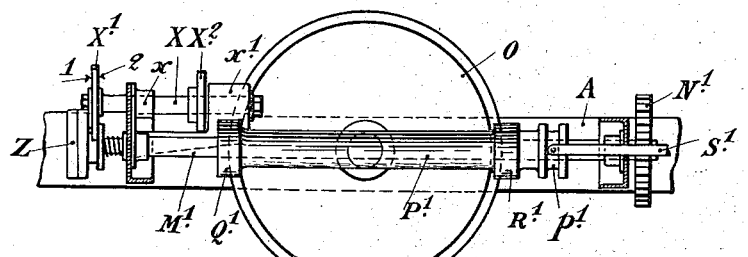

In these various figures, A is the framing of the transport vehicle which is adapted to carry at the same time a small caliber gun and a motor indicated diagrammatically at C.

The framing A is connected by cross members $a$ either to endless track-trucks of known construction, or, as is assumed in the example shown, to the internal elements D, D$^1$ of two pairs of side-plates D, E, D$^1$, E$^1$, serving as guides to endless chains F—F$^1$. Each of these chains is carried by the toothed drive wheel $g$ and the guide-pulleys $h$ and $i$, said wheel and pulleys being respectively mounted on the shafts G, H, I journaled in the side-plates of the chain. The driving wheels $g, g$ of the chains F, F¹ receive their motion from two cross shafts J, J¹ which are arranged in line with each other and are mounted respectively in the framing A and the inner side-plates D, D¹. The power is transmitted from the cross shafts to the drive-wheels $g, g$ by means of a pinion and chain K, L or K¹, L¹.

The shafts J and J¹ receive their motion through two longitudinal shafts M, M¹ which are parallel to the longitudinal axis of the framing A and are mounted in bearings carried by the latter. One of these shafts M¹ is driven directly by the motor C. The two shafts M, M¹ are connected together by toothed wheels N, N¹ having equal numbers of teeth. The transmission of the power from M to J on the one hand and from M¹ to J¹ on the other, is effected as follows: Each of the shafts J and J¹ carries a friction disk O, O¹. On each of the shafts M, M¹ there is adapted to slide a sleeve P, P¹ carrying at its two ends rollers Q, R and Q¹, R¹. The two mechanisms P—Q—R, P¹—Q¹—R¹, while rotating with the shafts M, M¹, are capable at any moment of being shifted longitudinally by means of connecting rods S, S¹ which terminate at one end in a fork engaged in a sleeve $p, p^1$, while their other end $s, s^1$ is connected to one of the arms of a rocking beam T—T¹. This rocking beam is itself pivoted at $u$ to one of the ends of a link U hinged at its other end $u^1$ to the framing A. The rocking beam T—T¹ is actuated by a control rod V provided with a handle $v$ projecting from the rear of the framing A and situated within the reach of the steerer and operator (Fig. 1). The latter may be carried in a trailer W coupled to the framing A. This trailer is preferably constructed as shown in Figs. 1 and 2ª, in the form of a hammock car in which the operator can lie full length.

It will be seen that by moving the control rod V parallelly to the axis of the framing, the operator is able to shift simultaneously forward or backward the roller-bearing sleeves P, P¹ and thereby bring either the rear rollers or the front rollers into contact with the disks O, O¹ at a variable point of said disks. The chains F will thus be actuated both together in one direction or in the other at variable speeds.

If now the operator moves the control rod V, and consequently the rocking beam T—T¹, around the pivotal connection of the latter to the lever U, he will cause the two connecting rods S, S¹ to move in opposite directions, and he will thereby steer the vehicle to the right or to the left according to the direction in which he has moved the rocking beam.

As shown in Fig. 7, a shock-absorbing device, such as a spring $v^1$, may be provided with advantage between the rod V and the handle $v$. The rocking beam T—T¹ may likewise be divided into two sections which a spring $t$ has a tendency to keep in line with each other. The two sections T, T¹ will thus be able to move scissorswise nearer to or away from each other to a slight extent.

As the improved vehicle will have to run on ground of very varying surface and configuration, it is important that it shall not exceed a normal speed depending on the power of the motor. In other words it is important to prevent automatically the operator from producing a movement of the friction rollers which might cause the driven chains from exceeding the said speed in cases where the nature of the ground would not allow the motor to produce the desired speed.

Figure 5:
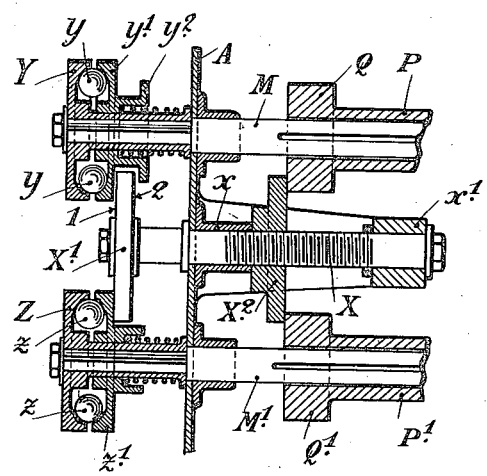

In bearings $x, x^1$, formed or carried by the framing A, there is adapted to rotate a screw-threaded shaft X carrying a friction disk X¹ at its outer end. With the screw-thread of this shaft X there is engaged a nut X² which will move longitudinally when the shaft X is rotated. These longitudinal movements are limited by two stops constituted by the two bearings $x, x^1$ respectively. The disk X¹ is arranged to receive rotation in one or the other direction by the action upon its faces 1 or 2, of two centrifugal governors Y, Z that are actuated respectively by the shafts M and M¹. When the speed of the motor reaches the determined maximum, the balls $y$ and $z$ will move the inner sleeves $y^1$ and $z^1$ apart against the pressure of the springs bearing on the inner faces of said sleeves as shown in Fig. 5. The sleeve $z^1$ will rub against the face 1 of the disk X¹ and will thus rotate the said disk, thereby causing the nut X² to move toward the stop bearing $x$. The operator will then be able to shift the roller-bearing sleeves P and P¹ until they reach the position shown in Fig. 5, and to increase the speed of rotation of the chains in proportion to the possible speed of rotation of the motor.

Figure 6:
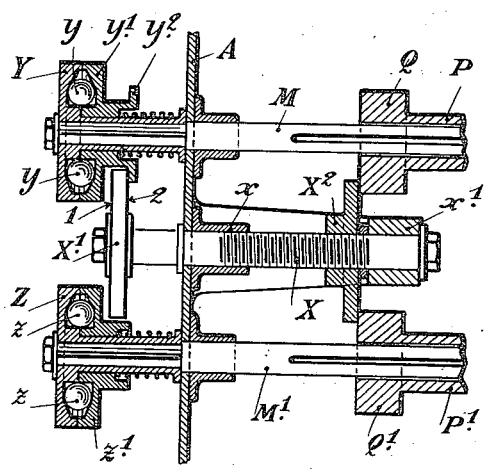

If, on the contrary, the speed of rotation of the motor should fall to the determined lower limit, the governors which have been adjusted for this purpose, will allow the movable sleeves $y^1$—$z^1$ through the action of their springs to move nearer to the corresponding fixed sleeves as shown in Fig. 6. During this approaching movement, a flange $y^2$ on the sleeve Y¹ will rub against the face 2 of the disk X¹ and thus impart to the shaft X a rotary motion having the opposite direction to that which it produced previously. The nut X² is then moved in the reverse direction and will act automatically upon the rollers Q, Q¹ in the case that the sleeves P, P¹ should have been moved too far forward. When the nut $X^2$ butts against the bearing $x^1$, the possible extreme forward position of the rollers Q, $Q^1$ will correspond to the permissible speed of the chains, according to the present speed of the motor.

Figure 8:
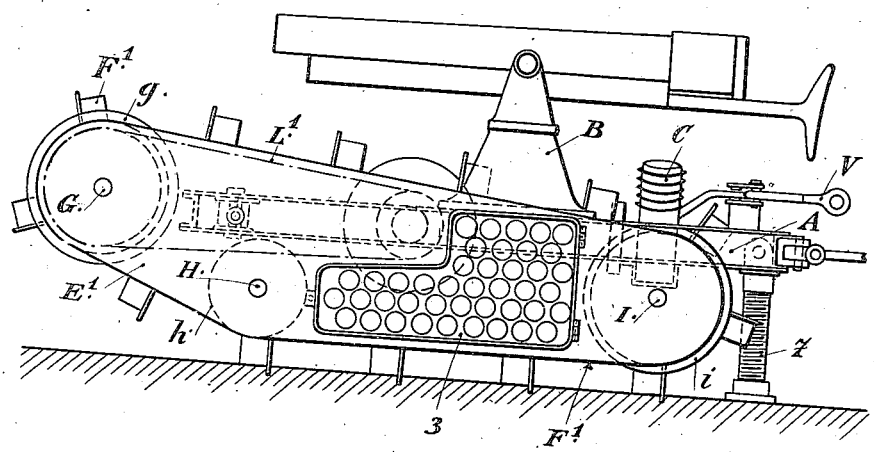
Figs. 8 and 9 are respectively a side elevation and a plan of a modification of the transport vehicle shown in the position it occupies for bringing the gun carried by it into position for firing.
Figure 9:
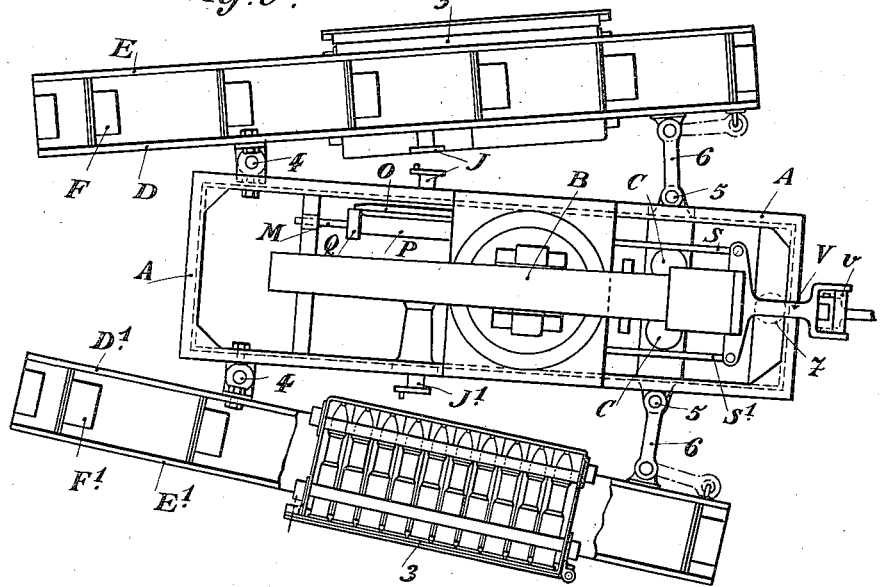

In the constructional form shown in Figs. 8 and 9, the chain supporting frames serve each to accommodate a munition chest 3.

On the other hand, the inner side-plates D, $D^1$ instead of being fixed rigidly to the framing A, are connected to the latter in front by pivotal connections 4, and at the rear by pivotal connections 5. 6 are short connecting rods which may be placed in the position indicated in dot and dash lines for traveling. In firing, these connecting rods act as stays between the framing A and the side-plates D, $D^1$ which are then caused to diverge to the amount of a slight angle as indicated in full lines in Fig. 9. The frame A is provided at the rear with a point of support by a screwjack 7 which can be raised for transport. By this means it will be readily perceived that the horizontal range of firing of the gun B is increased.

It is to be understood that a coupling must be provided between the two sections of each of the shafts J and $J^1$ which are suitably divided into sections.

As shown in dot and dash lines in Figs. 1, 2 and $2^a$, the stability of the vehicle in the firing position can be provided for by any suitable means, for instance by struts 8 which are jointed to the gun pedestal B and are provided with anchoring spades 9 at their lower ends.

What I claim is:—

1. In a transport vehicle, a supporting frame, track-trucks mounted on opposite sides of the supporting frame to propel the vehicle, a motor on the supporting frame having a driving connection with each track-truck, speed and direction changing mechanism interposed in the driving connection between the motor and each track-truck, a rocking beam pivoted intermediate of its ends to a member shiftably mounted on the rear part of the supporting frame, said rocking beam being connected at each end with one of the speed and direction changing mechanisms, and a control lever extending rearward from the rocking beam and operative to move said beam to change through the intervening mechanism the speed or direction of either or both of said track-trucks.

2. In a transport vehicle, a supporting frame, track-trucks mounted on opposite sides of the supporting frame to propel the vehicle, a motor on the supporting frame having a driving connection with each track-truck, speed and direction changing mechanism interposed in the driving connection between the motor and each track-truck, a rocking beam pivoted intermediate of its ends to the free end of a link hinged at its other end to the rear part of the supporting frame, said rocking beam being connected at each end with one of the speed and direction changing mechanisms, and a control lever extending rearward from the rocking beam and operative to move said beam to change through the intervening mechanism the speed or direction of either or both of said track-trucks.

3. In a transport vehicle, a supporting frame, track-trucks mounted on opposite sides of the supporting frame to propel the vehicle, a motor on the supporting frame having a driving connection with each track-truck, speed and direction changing mechanism interposed in the driving connection between the motor and each track-truck, a rocking beam comprising two sections connected at their outer ends with the speed and direction changing mechanisms and pivotally mounted at their inner ends on the free end of a link hinged at its other end to the rear part of the supporting frame, a spring normally holding in alinement the rocking beam sections, and a control lever having an elastically attached handle extending rearward from the rocking beam and operative to move said beam to change through the intervening mechanism the speed and direction of either or both of said track-trucks.

4. In a transport vehicle, a supporting frame, track-trucks mounted on opposite sides of the frame to propel the vehicle, two alined shafts extending across the frame with each shaft having a driving connection with the track-truck on its respective side, two parallel shafts extending longitudinally of the frame between the inner ends of the cross shafts, a motor on the frame for rotating the two longitudinally extending shafts, a speed and direction changing mechanism connecting each longitudinally extending shaft to the adjacent cross shaft, and a single control member connected with both of the speed and direction changing mechanisms to be operated to change the speed and direction of the cross shafts and of the track-trucks.

5. In a transport vehicle, a supporting frame, track-trucks mounted on opposite sides of the frame to propel the vehicle, two alined shafts extending across the frame with each shaft having a driving connection at its outer end with the track-truck on its respective side, a disk on the inner end of each cross shaft, two parallel shafts extending longitudinally of the frame between the disks, a sleeve slidable on each longitudinal shaft to rotate with the same and having rollers at its ends to bear against the adjacent disk to rotate the latter, a motor on the frame for rotating the longitudinal shafts, and a single control member connected with both of the sleeves to move the latter in either direction to vary the positions of the rollers on their respective disks to change the speed and direction of rotation of the cross shafts with a corresponding change in the track-trucks.

6. In a transport vehicle, a supporting frame, track-trucks mounted on opposite sides of the frame to propel the vehicle, two alined shafts extending across the frame with each shaft having a driving connection at its outer end with the track-truck on its respective side, a disk on the inner end of each cross shaft, two parallel shafts extending longitudinally of the frame between the disks, a sleeve slidable on each longitudinal shaft to rotate with the same and having rollers at its ends to bear against the adjacent disk to rotate the latter, a motor on the frame for rotating the longitudinal shafts, a rocking beam pivoted intermediate of its ends to the free end of a link hinged to the frame, rods connecting the ends of the rocking beam with the sleeves, and a handle on the rocking beam to move the latter to shift through the connecting rods the sleeves to vary the positions of the rollers on the disks to change the speed and direction of rotation of the cross shafts with a corresponding change in the track-trucks.

7. In a transport vehicle, a supporting frame, track-trucks mounted on opposite sides of the frame to propel the vehicle, two alined shafts extending across the frame with each shaft having a driving connection at its outer end with the track-truck on its respective side, a disk on the inner end of each cross shaft, two parallel shafts extending longitudinally of the frame between the disks, a sleeve slidable on each longitudinal shaft to rotate with the same and having rollers at its ends to bear against the adjacent disk to rotate the latter, a motor on the frame for rotating the longitudinal shafts, a single control member connected with both of the sleeves to move the latter in either direction to vary the positions of the rollers on their respective disks to change the speed and direction of rotation of the cross shafts with a corresponding change in the track-trucks, an adjustable stop for limiting the outward movement of the sleeves on their respective shafts, and centrifugal governors on the shafts carrying the sleeves operating to position the adjustable stop as the motor reaches either limit of its speed.

8. In a transport vehicle, a supporting frame, track-trucks hinged at their forward ends to opposite sides of the supporting frame to propel the vehicle, detachable stay-rods to connect the rear ends of the track-trucks with the supporting frame when the track-trucks are turned outwardly at their ends from the supporting frame, a motor on the supporting frame having a detachable driving connection with each track-truck, speed and direction changing mechanism interposed in the driving connection between the motor and each track-truck, and a single control member connected with both of the speed and direction changing mechanisms to be operated to change the speed or direction of either or both of the track-trucks.

9. In a transport vehicle, a supporting frame, track-trucks hinged at their forward ends to opposite sides of the supporting frame so that said track-trucks can be angularly displaced relatively to the supporting frame, means for holding the track-trucks in their angular displacement relatively to the supporting frame, and a motor on the supporting frame for driving the track-trucks to propel the vehicle, the connection between the motor and the track-trucks being detachable to permit the angular displacement of said track-trucks.

In testimony whereof I have signed this specification.

EUGÈNE SCHNEIDER.